Sept. 22, 1970      P. EGLI      3,529,493

POWER TRANSMISSION

Filed Oct. 29, 1968      3 Sheets-Sheet 1

INVENTOR.
PETER EGLI

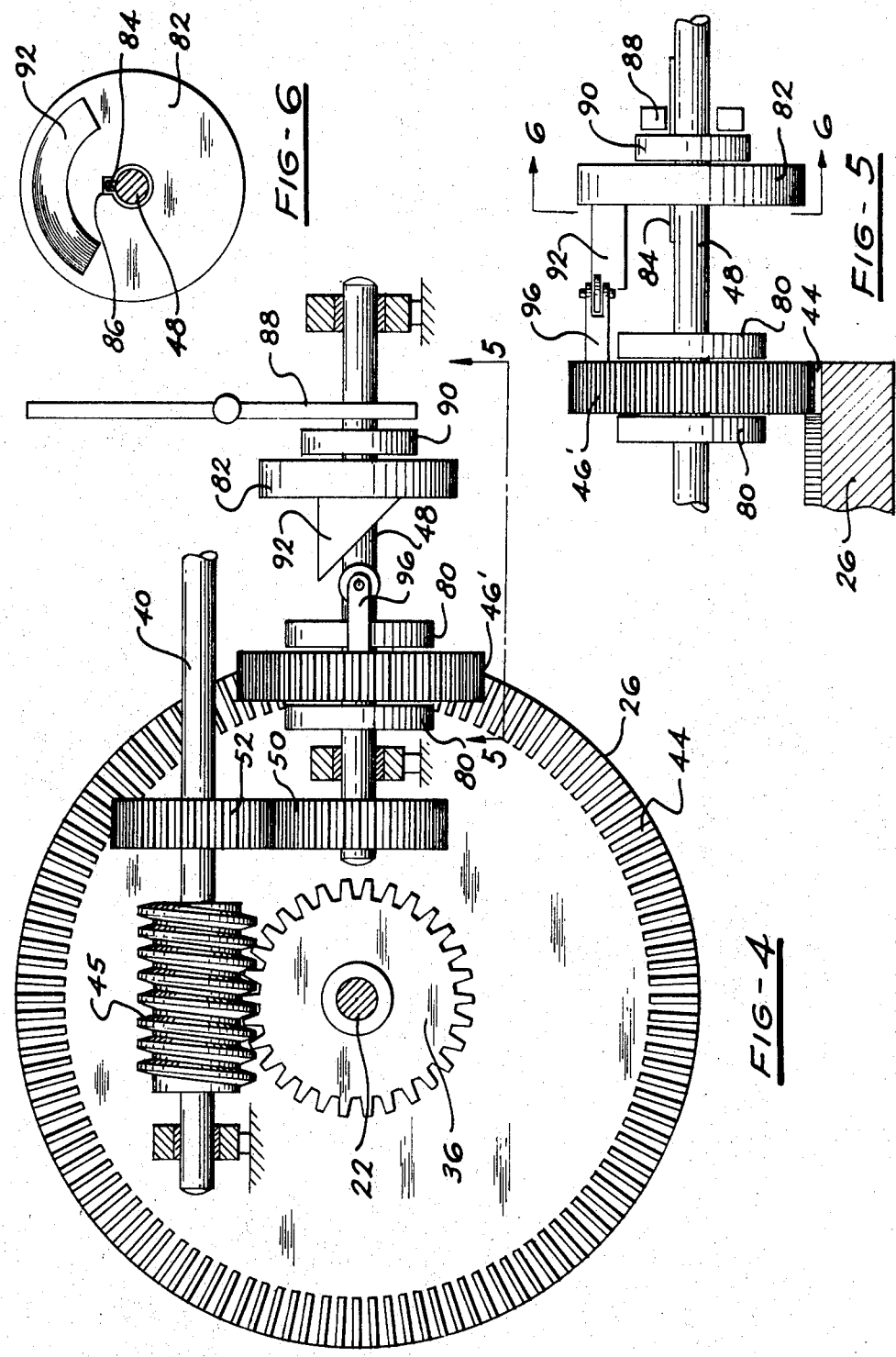

United States Patent Office 3,529,493
Patented Sept. 22, 1970

3,529,493
POWER TRANSMISSION
Peter Egli, Weymouth, Mass.
(Continental Lane, Titusville, N.J. 08560)
Filed Oct. 29, 1968, Ser. No. 771,444
Int. Cl. F16h 57/10
U.S. Cl. 74—785          9 Claims

ABSTRACT OF THE DISCLOSURE

A gear transmission in which the relation between the input and output torque and speed is infinitely variable. The transmission embodies a planetary gear system including means to effectively, controllably regulate the rotational velocity of the ring gear of the system and thereby alter the gear ratio of the transmission. The velocity of the ring gear is regulated by a braking arrangement that includes a worm helix that is synchronously rotatable with a pinion formed integral with the ring gear. The worm is driven by the ring gear through a gear train and means are provided to vary the phase relationship between the worm helix and the pinion thus to increase or retard the rotational velocity of the ring gear and concomitantly the gear ratio of the system.

BACKGROUND OF THE INVENTION

In mechanical automotive transmissions or change speed gearing of other power output devices, it has heretofore been the practice to employ arrangements that enable the motion to be transmitted through different ratios or combinations of gearing in order to vary the output speed of the apparatus. Where a high degree of variability is desired, it has been necessary to increase the number of gear combinations which, of course, results in increased expense due to the additional gearing that must be provided. Such a method of increasing change speed variability is also undesirable for the reason that it increases the size of the transmission and therefore the amount of space necessary to contain it. A still further objection to the use of increased gear combinations to obtain change speed variability is that where gear trains employing a number of intermeshing gears are employed the power transmission efficiency of the system is reduced, due to increased friction losses in the gearing.

Planetary gear systems have long been known as being effective to obtain speed reductions of large magnitude. In such apparatus the gear ratio of the system can be varied from infinity to unity by varying the rotational velocity of the ring gear. The use of planetary gear systems in automotive and other applications of this nature has been limited, however, due to the fact that forces of large magnitude are generated by the prime mover and therefore proportionately great forces must be applied to the ring gear in order to regulate its rotational velocity. These great forces, in turn, generate much friction resulting in considerable power losses making such a system impractical except in low load applications. Where planetary systems have been employed, the rise of ancillary apparatus in the form of hydraulic torque converters, or the like, have been required. This, of course, adds to the expense and complexity of the transmission system.

SUMMARY OF THE INVENTION

According to the present invention there is provided a simple, mechanical gear transmission adaptable for use in automotive and other similar high load applications wherein the relation between input and output speed and torque can be infinitely varied. In general, the transmission of the invention embodies a planetary gear system comprising ring, planet and sun gears operatively disposed between the prime mover and the driven device and means for effectively and controllably varying the rotational velocity of the ring gear thereby to alter the output speed and torque of the system. The speed of the ring gear is varied by an arrangement that includes a pinion formed integral with the ring gear, a worm having a helix adapted to mesh with the pinion and mounted on an axially reciprocable shaft that permits the worm helix to be brought into bearing relation with the pinion gear teeth thereby to impede ring gear rotation. A gear train connects the ring gear and the worm to rotate the latter in continuous synchronism with the pinion.

DESCRIPTION OF THE DRAWINGS

FIG. 4 is a view, similar to FIG. 1, illustrating another form of speed modulating mechanism for use with the invention;
FIG. 5 is a partial elevational view taken along line 5—5 of FIG. 4;
and
FIG. 6 is a view taken along line 6—6 of FIG. 5.

DESCRIPTION OF THE PREFERRED EMBODIMENT

Figure 1:
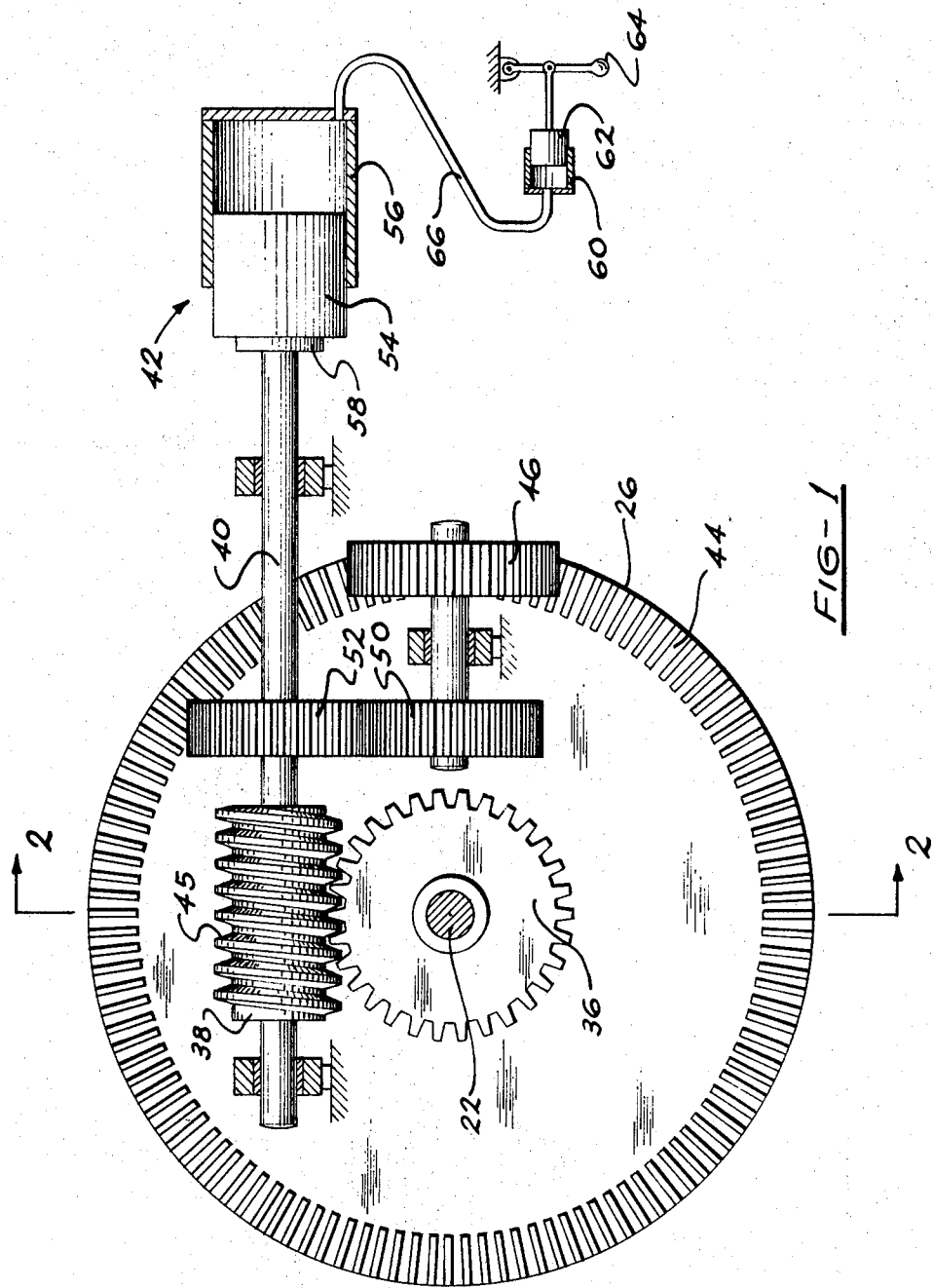
FIG. 1 is a somewhat schematic representation of one form of the transmission of the present invention.
Figure 2:
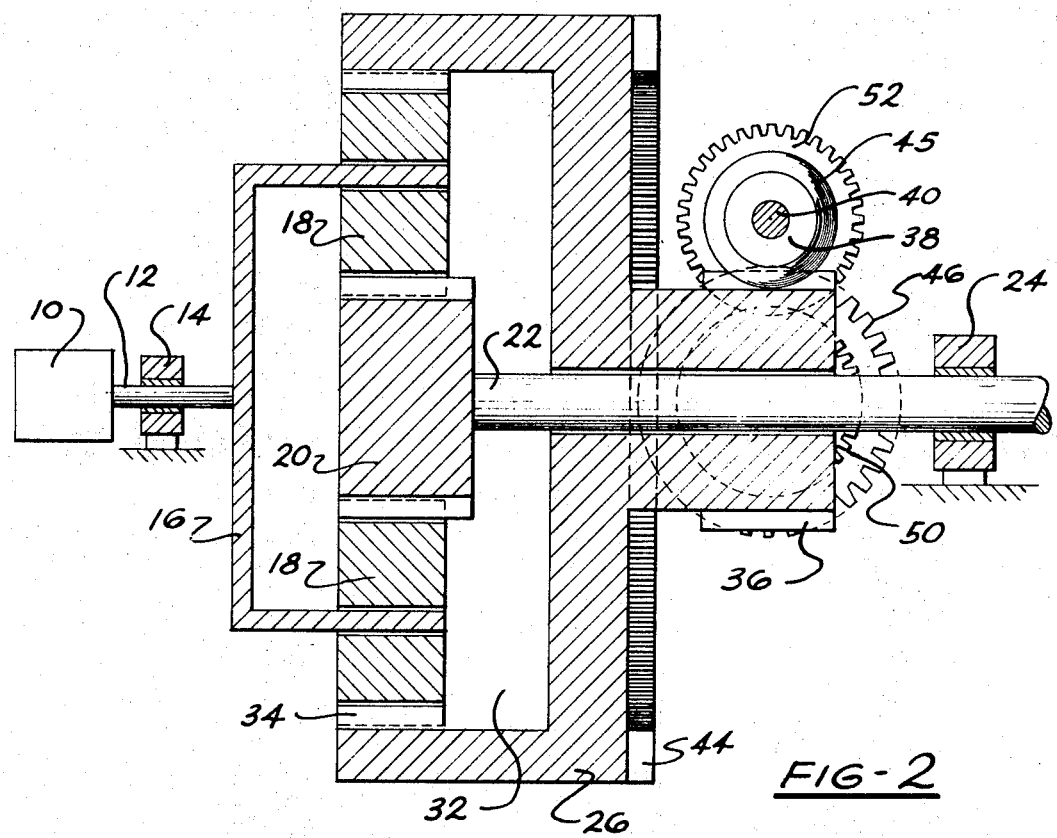
FIG. 2 is a vertical section taken along line 2—2 of FIG. 1.

With particular reference to the drawings, the numeral 10 indicates a prime mover having a drive shaft 12 appropriately journaled in a frame as by means of bearing 14 for rotational movement. The shaft 12 at its end is formed as a multiple armed spider 16 which, in the arrangement shown, mounts a pair of planet gears 18 freely rotatably attached to each arm. The planet gears 18 are adapted to mesh with a sun gear 20 that is fixed to an output shaft 22, the latter being journaled in a frame as by means of a bearing 24 for rotational motion. The output shaft 22 is provided at its opposite end (not shown) with means for drivingly connecting it with apparatus to be driven by the prime mover 10 through the novel transmission of the invention.

Thus far in the description it will be seen that rotation of the drive shaft 12 by the prime mover 10 in a clockwise direction will cause the spider 16 and thereby the planet gears 18 to travel in mesh about the sun gear 20. Because the planet gears 18 travel freely about the sun gear 20 no movement will occur in the sun gear and the output shaft 22 to which it is fixed will remain stationary.

In order that the planet gears 18 can drive the sun gear 20 and shaft 22 a ring gear 26 is provided in encircling meshing relation with the planet gears. As shown, the ring gear 26 comprises a body journaled for rotation within a frame which may be the same or a different frame than that which mounts the bearings 14 and 24. The body 26 is provided on one side with an enlarged annular recess 32 adapted to receive the planet gears 18 and sun gear 20 in meshing assembly. About the inner peripheral surface of the recess 32 is provided a set of internal gear teeth 34 adapted to mesh with the teeth on the planet gears 18.

As the description hereof proceeds, it will be seen that the torque produced by operation of the prime mover 10 through the planet gears 18 will be transmitted to either the sun gear 20, the ring gear 26, or dividedly in varying degrees to both. Thus, the extremes of the operation of the transmission can be defined by situations, one that wherein the ring gear 26 can rotate freely, and the other wherein the ring gear is held against rotational movement.

In the former situation, assuming the existence of a load on the output shaft 22, the torque transmitted to the planet gears 18 will be dissipated entirely by rotating the ring gear 26 and no movement will occur in the sun gear 20. Theoretically, therefore, in this instance the rotational velocity of the sun gear will be zero and the gear ratio between the gears may be considered to be infinite. At the other extreme, with the ring gear 26 held stationary, the torque transmitted to the planet gears 18 from the prime mover 10 will be entirely dissipated in rotating the sun gear 20. This situation, therefore, defines the lowest gear ratio of the system, i.e. that wherein all of the torque generated by the prime mover 10 is transferred to the output shaft 22.

According to the invention means are provided to regulate the rotational velocity of the ring gear in order to controllably vary the gear ratio of the system. This means comprises a modulated gear 36 formed integrally on the rear face of the body 28 of the ring gear 26 and in coaxial relation therewith. The modulator gear 36 is operatively associated with a worm 38 having a helix adapted to mesh with the teeth on the former. In order that the ring gear 26 can run free with the system in the "neutral" position the relationship between the worm helix and the teeth on the gear 36 is one wherein there is a slight amount of clearance between the two. The worm 38 is fixedly mounted on a rotatable shaft 40 which is also adapted to be axially shiftable by means of a modulator mechanism 42 described hereinafter.

Means are provided to rotate the worm shaft 40 and thereby the worm 38 at the same velocity as the ring gear 26. This means comprises a gear train comprising face gear teeth 44 formed on the rear surface of the ring gear body 28, a gear 46 adapted to be driven by the face gear teeth fixedly mounted on rotatable shaft 48 mounted parallel to the shaft 40 and an intermeshing gear pair including gears 50 and 52 mounted on the shafts 48 and 40, respectively. In the disclosed arrangement, by way of example, the face gear teeth 44 are 144 in number while the gear 46 and modulator gear 36 are each provided with 12 teeth. The gears 50 and 52 are provided with an equal number of teeth such that the resulting effect is to rotate the worm 38 at a velocity ratio, in this case 12 to 1, that will retain its helix in continuously meshing relation with the teeth on the modulator gear 36.

It is readily apparent, therefore, that by means of the disclosed arrangement, the velocity of the worm 38 is automatically retained in synchronism with the modulator gear 36. This relationship is maintained due to the fact that, as the velocity of the ring gear 26 is increased or reduced, a corresponding increase or reduction in rotational velocity is imparted to the worm 38.

In order to selectively regulate the speed of the ring gear 26, thereby to alter the gear ratio of the transmission, means are provided to vary the phase relationship that exists between the worm helix 45 and the teeth of the modulator gear 36. By altering the phase relationship between the helix 45 and gear 36, the opposing faces of these members are brought to bear on one another thereby effecting a braking action on the ring gear 26. In the preferred form of the invention, means are provided to shift the worm shaft 40 axially thus to change the phase relationship between the worm helix 45 and gear 36.

One form of mechanism operative to produce this function is shown in FIG. 1. The modulator mechanism here shown comprises an hydraulic or pneumatic piston-cylinder arrangement including a piston 54 that is operable in cylinder 56 and which is attached to one end of the worm shaft 40 through a thrust bearing 58. A controller 60 in the form of a second, smaller piston-cylinder set is provided to selectively admit or discharge fluid to and from the cylinder 56 thus to advance or retract the worm helix 45 with respect to the teeth of the modulator gear 36. The controller 60 includes a piston 62 operated by lever 64 or the like to inject or release motive fluid into or out of the cylinder 56 through connecting line 66.

The operation of the herein disclosed transmission arrangement is as follows. With the modulator mechanism 42 in the "neutral" position, i.e. with the worm helix in phase with the teeth on modulator gear 36 and thus out of bearing relation therewith, the prime mover 10 is operated to rotate the drive shaft 12 which moves the planet gears 18 about the sun gear 20. Because the ring gear 26 can rotate freely due to the "in phase" relation between the worm 38 and gear 36 all of the torque produced by the prime mover 10 will be imparted to rotate the ring gear with no torque being passed to the sun gear 20. Thus no motion will occur in the sun gear 20 or output shaft 22. The rotation of the ring gear 26 is imparted to the worm 38 through the gear train comprising the face gear 44 and gears 46, 50, and 52 so that the worm 38 maintains its "in phase" relationship with the modulator gear 36. Any adjustment in the rotational velocity of the ring gear due to a change in the output of the prime mover 10 will be immediately reflected in the worm since the latter is driven off the ring gear through the gear train. As the operator adjusts the position of lever 64 to move the piston 62 into its associated cylinder, fluid is passed through line 66 to increase the fluid pressure within cylinder 56 thereby to move the piston 54 and worm shaft 40 slightly to the left. This action brings the face of the worm helix into bearing relationship with the face of the teeth on the modulator gear 36 to effect a braking action on the ring gear 26 which retards its angular motion. Since the worm 38 is driven off the ring gear 26, its rotational velocity will be correspondingly reduced to keep it in mesh with the gear 36. Braking the ring gear causes some torque to be transmitted to the sun gear 20 to produce a rotation in the output shaft 22. Due to the inherent characteristics of the planetary system, the effective gear ratio of the transmission with only a slight amount of bearing pressure between the worm 38 and modulator gear 36 will be great, theoretically approaching infinity. As the control lever 64 is adjusted to advance the worm 38 and thus to increase the bearing pressure between it and the gear 36, the rotational velocity of the ring gear 26 is correspondingly reduced to transmit greater amounts of input torque to the output shaft at lower gear ratios. When sufficient pressure is brought to bear between the worm and the gear 36, the ring gear motion will be terminated to produce a gear ratio of 1 to 1 in the transmission.

Figure 3:
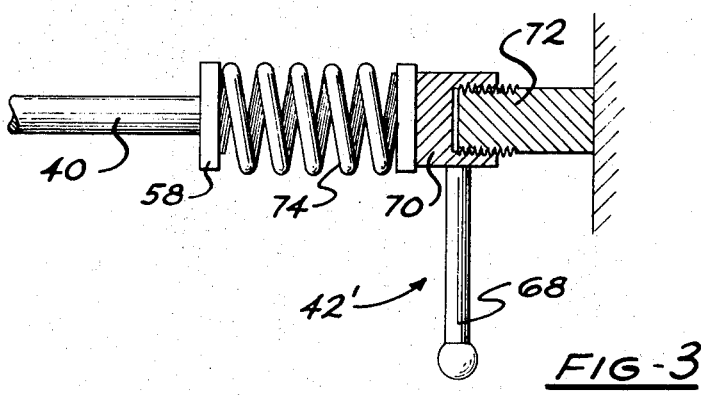
FIG. 3 is a partial view of a modified form of speed modulating mechanism adapted for use in the present invention.

FIG. 3 illustrates a modified form of modulator mechanism, indicated as 42′, which comprises a rotatable control lever 68 attached to an internally threaded nut member 70. The nut member 70 engages an externally threaded post 72 fixedly mounted on the transmission housing such that rotation of the lever 68 will advance or retract the nut member along the post. As shown, the nut member 70 is adapted to effect axial shifting of the worm shaft 40 through a compression spring 74 that is attached at one end to the nut member and which, at its other end, bears against the thrust bearing 58 mounted upon the end of the worm shaft 40. In this arrangement, rotation of the control lever 68 a selected degree will effect a corresponding axial shifting of the worm shaft 40 and worm 38.

It should be appreciated that in the present arrangement, because the braking of the ring gear 26 is produced by the coaction between the worm 38 and the modulator gear 36, forces generated by the ring gear 26 opposing the action of the worm will be transmitted along the worm shaft 40 and not be effective to produce a retrograde angular motion in the worm. Thus, the ring gear torque can be effectively offset by imposing an axially directed static force along the worm shaft rather than by means of an opposing torque. In effect, therefore, the worm 38 operates as a semiconductor of generated torque, being capable of transmitting an opposite torque against that developed by the ring gear but, at the same time, having its own rotation insensitive to the torque transmitted by the ring gear, these forces being transmitted axially along the worm shaft.

Because of the arrangement, therefore, higher torques imposed on the ring gear by the prime mover can be readily offset to retard the rotation of the ring gear by simply applying an axial force along the worm shaft. Such action will thus render the planetary transmission effective in high torque-producing applications such as in automotive gear transmissions or the like.

In FIG. 4 there is illustrated another arrangement suitable, although less desirable than the mechanisms of FIGS. 1 and 3, for modulating the output of the transmission system of the invention. As in the previously described arrangements, the modulating impulses for varying the rotational velocity of the ring gear 26 are transmitted to the gear by altering the phase relationship that exists between the helix on worm 38 and the teeth on modulator gear 36. Similar to the prior structure, the worm 38 is fixedly secured to shaft 40 for rotation therewith but, unlike the previous arrangement, the shaft is not axially shiftable. Rotation of the shaft 40 is effected by the interaction of gears 50 and 52, the latter being attached for rotation with shaft 48 which is disposed in parallel relation to the shaft 40 and which carries the drive gear, here indicated as 46', whose teeth are adapted to mesh with those of the face gear 44 from whence the driving force for rotating the worm 38 is derived. In this arrangement, however, the drive gear 46' is mounted on the shaft 48 in a manner that permits it to freely rotate with respect to the shaft, being merely restrained against the axial movement by thrust bearings 80.

In addition to the gears 46' and 52 the shaft 48 also mounts a cam wheel 82 that is attached for rotational motion with the shaft by means of key 84. As shown in FIG. 6, the shaft and key opening 86 provided through the cam wheel 82 is such as to present a clearance fit between the shaft and the wheel whereby the wheel, while it is rotatable with the shaft, is also axially slidable therealong, being operated toward and away from the gear 46' by means of a pivotally mounted yolk 88 that operates through slide collar 90 to impart axial travel to the cam wheel.

The cam wheel 82 is provided on its surface that faces the gear 46' with an arcuately formed cam 92 having an inclined face 94 that is adapted to engage a cam follower 96 formed integral with the drive gear 46'. The inclination of the face 94 is such that, as the cam 92 is brought to bear on the follower 96 by pivoting the yolk 88, the force imparted to the follower, and thus to the drive gear 46', will tend to rotate the gear in a direction counter to that in which it would be driven by its meshing engagement with the face gear teeth 44 on ring gear 26.

With this form of modulating apparatus, it will be obvious that a one-to-one gear ratio will be achieved by the transmission when the cam wheel 82 is in its retracted position and the cam 92 disengaged from the follower 96 since the ring gear 26 will be locked against rotation. The locked disposition of the ring gear 26 is effected by the fact that the forces generated by planet gears 18 that would tend to rotate the ring gear are offset by the rotational immobility of the worm 38, it being drivingly disconnected from the ring gear by the fact that the drive gear 46' is free to rotate on shaft 48. Such forces, therefore, will merely be transmitted through the ring gear 26, and thus through modulator gear 36, to the worm helix and thence in an axial direction along shaft 40. As the cam wheel 82 is axially shifted toward the gear 46' and the face 94 of cam 92 is forced against the follower 96 a force countering the force generated by the ring gear 26 will be produced, thereby relieving the worm 38 of the pressure generated by the modulator gear 36 and bringing its helix back into closer synchronization with the teeth on the modulator gear. When this occurs a direct drive will be established between the ring gear 26 and the worm 38 since the forces generated by planet gears 18 to rotate the ring gear will be transmitted through the face gear 44 to drive gear 46' and through follower 96 to the cam 92 and cam wheel 82 thus to rotate shaft 48 and with its gear 52 which drives gear 50 on shaft 40 to which worm 38 is attached for rotation. Thus, the greater the force imparted to the cam wheel 82 by yolk 88, the greater will be the relief to the worm 38 such that the maximum force will place the worm helix in full synchronization with the modulator gear teeth whereby the ring gear 26 is permitted to rotate freely, thus to produce zero transmission output.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In a power transmission for establishing variable driving connection between rotatable input and output shafts of the type including a sun gear operatively connected to one of said shafts, a rotatable ring gear surrounding said sun gear, and a plurality of planet gears operatively connected to the other of said shafts and being in meshing engagement with said sun and ring gears for orbital movement about said sun gear, the improvement comprising means for varying the rotational velocity of said ring gear and thereby the driving relation between said input and output shafts, said means comprising:
   (a) a driven gear connected to said ring gear for rotation in unison therewith;
   (b) a worm having a helix in meshing relation with teeth on said driven gear;
   (c) means for rotating said worm at a velocity proportional to that of said driven gear; and
   (d) means for varying the phase relationship between said helix and the teeth on said driven gear to alter the rotational velocity of said ring gear.

2. Apparatus as recited in claim 1 wherein said worm rotating means includes:
   (a) face gear teeth on said ring gear; and
   (b) a gear train drivingly connecting between said face gear teeth and said worm.

3. Apparatus as recited in claim 1 wherein said driven gear is connected to said ring gear for coaxial rotation therewith and further including:
   (a) a worm shaft mounting said worm and being angularly disposed with respect to the axis of said driven gear;
   (b) face gear teeth disposed about said ring gear in concentric relation to said driven gear; and
   (c) a gear train drivingly connected between said face gear and said worm shaft comprising a drive gear in meshing engagement with said face gear teeth and a driven gear mounted on said worm shaft and being drivingly connected to said drive gear.

4. Apparatus as recited in claim 1 wherein said means for varying the phase relationship between said worm helix and said driven gear comprises means for imparting axial movement to said worm shaft.

5. Apparatus as recited in claim 4 wherein said movement imparting means includes:
   (a) fluid motor means including a piston drivingly connecting said worm shaft and being operative in a fluid chamber for adjustable movement parallel to the axis of said worm shaft; and
   (b) means for altering the fluid pressure in said chamber for imparting movement to said piston.

6. Apparatus as recited in claim 4 wherein said movement imparting means includes:
   (a) a stationary rod disposed in substantially coaxial relation to said worm shaft and having external threads thereon;

(b) an internally threaded nut engaging said rod, said nut being operatively connected to said worm shaft for imparting linear movement thereto; and (c) means for rotating said nut upon said rod.

7. Apparatus as recited in claim 3 wherein said means for varying the phase relationship between said worm helix and said driven gear includes means for disconnecting the drive connection between said gear train and said face gear teeth.

8. Apparatus as recited in claim 7 wherein said disconnecting means comprises:

(a) a drive gear freely rotatable on a drive gear shaft;

(b) a cam follower on said drive gear;

(c) a cam wheel fixed to said drive gear shaft for rotation therewith, said cam wheel being axially movable on said drive gear shaft;

(d) cam means on said cam wheel for applying a force to said cam follower for rotating said drive gear in a direction counter that imparted by said face gear; and (e) means for moving said cam wheel axially of said drive gear shaft and for urging said cam means into adjustable bearing engagement with said cam follower.

9. Apparatus as recited in claim 3 wherein said means for varying the phase relationship between said worm helix and said driven gear comprises means for imparting axial movement to said worm shaft, said axial movement imparting means including:

(a) fluid motor means including a piston drivingly connecting said worm shaft and being operative in a fluid chamber for adjustable movement parallel to the axis of said worm shaft; and (b) means for altering the fluid pressure in said chamber for imparting movement to said piston.

References Cited
UNITED STATES PATENTS

| | | | |
|---|---|---|---|
| 995,552 | 6/1911 | Osborn | 74—705 X |
| 1,604,112 | 10/1926 | Bultman | 74—705 |
| 3,273,421 | 9/1966 | Jones | 74—705 |
| 3,364,789 | 1/1968 | Whitfield | 74—675 |

ARTHUR T. McKEON, Primary Examiner